US011821805B1

(12) United States Patent
Chen et al.

(10) Patent No.: US 11,821,805 B1
(45) Date of Patent: Nov. 21, 2023

(54) HARD-SHELL INCLUSION STRAIN GAUGE AND HIGH FREQUENCY REAL-TIME MONITORING SYSTEM FOR 3D STRESS IN SURROUNDING ROCKMASS OF UNDERGROUND ENGINEERING

(71) Applicant: Institute of Rock and Soil Mechanics, Chinese Academy of Sciences, Wuhan (CN)

(72) Inventors: Weizhong Chen, Wuhan (CN); Xianjun Tan, Wuhan (CN); Wusheng Zhao, Wuhan (CN); Jianping Yang, Wuhan (CN); Hongming Tian, Wuhan (CN); Guojun Wu, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 18/347,475

(22) Filed: Jul. 5, 2023

(30) Foreign Application Priority Data

Oct. 19, 2022 (CN) .......................... 202211278984.0

(51) Int. Cl.
*G01L 5/1627* (2020.01)
(52) U.S. Cl.
CPC .................................. *G01L 5/1627* (2020.01)
(58) Field of Classification Search
CPC ..................................................... G01L 5/1627
USPC ........................................................ 73/862.44
See application file for complete search history.

(56) References Cited

U.S. PATENT DOCUMENTS

| | | | | |
|---|---|---|---|---|
| 4,662,458 A | * | 5/1987 | Ho | ............................. E21B 7/04 |
| | | | | 175/45 |
| 4,813,278 A | * | 3/1989 | Kosugi | ................. E21B 49/006 |
| | | | | 73/152.59 |
| 5,411,511 A | * | 5/1995 | Hall | ...................... A61F 9/0133 |
| | | | | 606/166 |
| 2021/0137589 A1 | * | 5/2021 | Basu | ....................... A61B 90/06 |
| 2021/0156249 A1 | * | 5/2021 | Wu | ......................... E21B 49/06 |
| 2023/0160761 A1 | * | 5/2023 | Guo | ........................ G01L 1/142 |
| | | | | 73/780 |
| 2023/0191858 A1 | * | 6/2023 | Pfefferkorn | ............ B60D 1/145 |
| | | | | 403/27 |

FOREIGN PATENT DOCUMENTS

| | | |
|---|---|---|
| CN | 108083046 A | 5/2018 |
| CN | 110608826 A | 12/2019 |
| CN | 216246921 U | 4/2022 |

* cited by examiner

*Primary Examiner* — Max H Noori
(74) *Attorney, Agent, or Firm* — Nitin Kaushik (57) ABSTRACT

This application relates to a hard-shell inclusion strain gauge for 3D stress in surrounding rockmass of underground engineering. The hard-shell inclusion strain gauge comprises an elastic cylinder and at least three sets of strain rosettes, wherein the elastic cylinder is installed in a borehole of underground engineering, and at least three sets of strain rosettes are equidistant along the circumference on the inner wall of the elastic cylinder. It can accurately measure strain values and variables of each strain rosette through data collection and transmission module, and calculate 3D stress in surrounding rock of underground engineering. It can obtain dynamic long-term monitoring of 3D stress evolution in complex environments of underground engineering, truly reflecting the real-time state, the spatial distribution, and the evolution of 3D stress in rockmass, and provide in-situ basic data for engineering disaster warning and control.

3 Claims, 6 Drawing Sheets

HARD-SHELL INCLUSION STRAIN GAUGE AND HIGH FREQUENCY REAL-TIME MONITORING SYSTEM FOR 3D STRESS IN SURROUNDING ROCKMASS OF UNDERGROUND ENGINEERING

CROSS-REFERENCE TO RELATED APPLICATIONS

The application claims priority to Chinese patent application No. 2022112789840, filed on Oct. 19, 2022, the entire contents of which are incorporated herein by reference.

TECHNICAL FIELD

This application relates to the field of 3D stress monitoring in underground engineering, in particular to a hard-shell inclusion strain gauge and high frequency real-time monitoring system for 3D stress in surrounding rockmass of underground engineering.

BACKGROUND

With the continuous increase in the depth and scope of underground engineering such as water conservancy, transportation, and mining, disasters such as rock bursts, large deformations, sudden water surges, and mining earthquakes induced by strong disturbance construction have become increasingly severe, and the frequency and severity of disasters are on the rise. Meanwhile, the number of underground engineerings being built in high-intensity earthquake areas in western China is increasing, and the seismic risks for these underground engineering cannot be ignored. The data collection of the deformation and stress response process of surrounding rockmass and structures during the earthquake process has always been a difficulty and focus of the industry, and there are no mature related products and technologies in the world.

Dynamic disasters such as rock burst and earthquake often cause huge damage to underground engineering. Taking rock burst in coal mines as an example, it often causes damage to construction equipment and major casualties, which seriously affects the construction progress and safety of projects. Therefore, the study on the occurrence mechanism of mining rock bursts, earthquakes, etc., and their monitoring and early warning method is an urgent and significant scientific and engineering task. The occurrence mechanism of dynamic disasters is the theoretical basis for monitoring and warning dynamic disasters. At present, there are different opinions on the occurrence mechanism and evaluation criteria of mining rock burst. Although no consensus has been reached, they all believe that complex geological structures and high stress concentration are the key factors causing dynamic disasters in the process of underground engineering construction. From this, it can be seen that real-time monitoring of the dynamic evolution process of 3D stress in the surrounding rock of underground engineering not only helps to understand the area and magnitude of stress concentration in the rockmass, but also provides reliable basis for dynamic disaster warning and effective engineering measures.

Seismic damage caused by strong earthquakes could result in partial or even complete failure of underground rock engineering, endangering the overall safety and operation of vital lifeline projects such as transportation roads, railways, and water and hydropower development projects, as well as national defense engineering. Therefore, conducting basic research on the earthquake disaster mechanism and seismic design theory of major rock underground engineering in strong earthquake areas has become a major demand for national security, socio-economic development, and engineering construction. At present, the dynamic response process of stress in underground engineering structures and surrounding rocks during earthquake is rarely obtained in engineering practices, which poses significant difficulties for the scientific and reasonable seismic design of underground structures. It is urgent to develop high frequency monitoring technologies to monitor the 3D stress dynamic response in surrounding rock and structures.

In addition, the 3D stress in surrounding rock of underground engineering generally needs to be continuously monitored over a relatively long period of time, usually lasting from several months to years. This places high demands on the long-term stability of monitoring devices. And the dynamic disasters occur rapidly, which also puts forward high requirements for the dynamic measurement ability of monitoring devices.

At present, in situ 3D stress measurement in underground engineering, soft inclusion strain gauges, aperture deformation gauge, fiber grating 3D strain sensors, unidirectional drilling strain gauges, etc. are commonly used. There are some problems when these sensors are applied to long-term monitoring of 3D stress in underground engineering. Due to the obvious rheological properties of the shell material of soft inclusion strain gauges, when used for long-term stress monitoring, the rheological properties of the shell can cause significant deviation in the measurement data, making it difficult to calculate accurate monitoring results. Currently, fiber grating strain sensors and vibrating wire strain gauges cannot collect 3D stress in real-time and high-frequency.

In summary, sensors in existing technologies cannot be used to monitor the 3D stress evolution process and the dynamic and static response process of surrounding rocks and structures in complex underground environments.

SUMMARY

To solve the above technical problems or at least partially solve them, this application provides a hard-shell inclusion strain gauge and high frequency real-time monitoring system for 3D stress in surrounding rockmass of underground engineering.

This application provides a hard-shell inclusion strain gauge for 3D stress in surrounding rockmass of underground engineering, including an elastic cylinder and at least three sets of strain rosettes. The elastic cylinder is installed in a borehole of the underground engineering, and at least three sets of strain rosettes are arranged on the inner wall of the elastic cylinder body at an equal spacing in a circumferential direction.

Preferably, the elastic cylinder comprises an elastic cylinder body, an elastic gland, and an elastic nut, wherein the two ends of the elastic cylinder body are opened, and the elastic nut correspondingly screws and sets the elastic gland at the two end openings of the elastic cylinder body, and the elastic gland correspondingly seals the two end openings of the elastic cylinder body.

Preferably, the elastic cylinder is made of elastic steel with a thickness of not less than 2 mm.

Preferably, the strain rosette comprises at least three resistance strain gauges that are arranged on the inner wall of the elastic cylinder in a direction of circumferential, axial, or ±45° with respect to the axis.

Preferably, among the at least 9 resistance strain gauges, at least 6 resistance strain gauges are arranged in directions that are not parallel to each other.

Preferably, the range of the resistance strain gauges is not less than 2000 micro strains.

Preferably, the hard-shell inclusion strain gauge also comprises a temperature compensated strain gauge that is arranged in the elastic cylinder along the axial direction, and uses the elastic steel as the base material.

Preferably, the gap between the outer wall of the elastic cylinder and the inner wall of the borehole is filled with quick-setting grouting material.

This application also provides a high frequency real-time monitoring system for 3D stress in surrounding rockmass of underground engineering, including:

A hard-shell inclusion strain gauge, which is used to collect 3D stress of underground engineering, and is set in a borehole of the underground engineering;

A data acquisition module, which is used to collect measurement data collected by the hard-shell inclusion strain gauge, and is connected to the hard-shell inclusion strain gauge;

An automatic analysis module, which is used to automatically analyze the 3D stress at the monitoring position based on the data transmitted by the data acquisition module and is connected to the data acquisition module;

Among them, the hard-shell inclusion strain gauge includes a hard-shell inclusion strain gauge as described in any of the above.

Preferably, the data acquisition module includes a photoelectric signal converter and a fiber grating demodulator, wherein the photoelectric signal converter is connected to the hard-shell inclusion strain gauge and the fiber grating demodulator, respectively, and the fiber grating demodulator is connected to the automatic analysis module.

The above technical solution provided in the embodiment of this application has the following advantages compared to the existing technology:

The application provides a hard-shell inclusion strain gauge and high frequency real-time monitoring system for 3D stress in surrounding rockmass of underground engineering, which changes the installation position of the measuring element from the outer wall of the shell in the existing technology to the inner wall of the elastic cylinder, so that the resistance strain gauge of the measuring element can be isolated and protected, significantly improving the success rate of installation and usage. Moreover, substituting resistance strain gauges for fiber optic grating improves the stability of product performance and enhances the success rate in manufacturing, installation, and application phases. The shell of the hard-shell inclusion strain gauge of the monitoring device is changed from the industrial plastic in the existing technology to the elastic steel with a thickness not less than 2 mm and the range of the resistance strain gauge not less than 2000 micro strains to ensure that the range of the hard-shell inclusion strain gauge is not less than 150 MPa, the modulus of the elastic cylinder is 200 GPa, the tensile strength is not less than 700 MPa, and the rheology of the elastic cylinder is greatly reduced, providing measurement accuracy during long-term monitoring. At least 6 non parallel resistance strain gauges are set in the elastic cylinder to ensure that there are 6 independent components in the stress distribution formula of the surrounding rock of the borehole, so that the required stress components can be solved. More than 6 independent equations can be obtained by using the layout of each resistance strain gauge along the circumferential direction, axial direction, or the direction with an interval of ±45° from the axial direction, which makes the calculation principle more simple and clear, and data processing can ensure that the acquisition results are more scientific and accurate.

BRIEF DESCRIPTION OF DRAWINGS

The figures herein are incorporated into the specification and form a part of this specification, showing embodiments in accordance with the invention and used together with the specification to explain the principles of the invention.

To provide a clearer explanation of the embodiments of the invention or the technical solutions in the existing technology, a brief introduction will be given to the figures required for the description of the embodiments or existing technology. It is evident that for ordinary technical personnel in the art, other figures can be obtained based on these figures without any creative labor.

DETAILED DESCRIPTION OF THE EMBODIMENTS

To make the purpose, technical solution, and advantages of the embodiments of the application more clear, the following will provide a clear and complete description of the technical solution in the embodiments of the application in conjunction with the figures. It is evident that the described embodiments are a part of the embodiments of the application, not all of them. Based on the embodiments of the invention, all other embodiments obtained by ordinary technicians in the field without creative labor are within the scope of protection of the invention.

As mentioned in the background technology, continuous long-term monitoring and development of high frequency real-time dynamic monitoring modes are required for monitoring the 3D stress of underground engineering. However, traditional sensors, due to the obvious rheological properties of the material itself, limited structural layout, single measurement direction, and low data collection frequency, are difficult to fit the long-term 3D stress monitoring requirements during ming rock burst and earthquake for underground engineering, and cannot achieve accurate dynamic monitoring.

Figure 1:
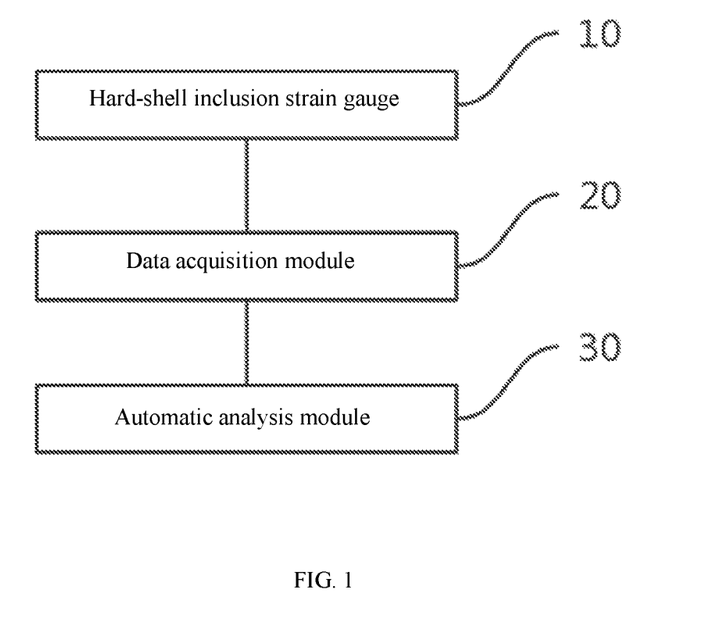
FIG. 1 is a structural schematic diagram of a high frequency real-time monitoring system for 3D stress in surrounding rockmass of underground engineering provided in the embodiment of the application.

FIG. 1 is a structural schematic diagram of a hard-shell inclusion strain gauge in a high frequency real-time monitoring system for 3D stress in surrounding rockmass of underground engineering provided in the embodiment of the application.

As shown in FIGS. 1-6, this application provides a 3D stress monitoring system for underground engineering, including:

hard-shell inclusion strain gauge 10, which is used to collect 3D stress of underground engineering and is arranged in a borehole of the underground engineering;

A data acquisition module 20, which is used to collect data provided by the hard-shell inclusion strain gauge 10 and is connected to the hard-shell inclusion strain gauge 10;

An automatic analysis module 30, which is used to automatically analyze the 3D stress at the monitoring position based on the data transmitted by the data acquisition module 20 and is connected to the data acquisition module 20.

Specifically, when monitoring the 3D stress of underground engineering, boreholes are set up in advance at the monitoring points of the underground engineering, and then a hard-shell inclusion strain gauge 10 is installed in the boreholes, and a data acquisition module 20 and an automatic analysis module 30 are configured. The hard-shell inclusion strain gauge 10 is connected to the automatic analysis module 30 through the data acquisition module 20. The number and location of boreholes can be set according to the needs of stress monitoring, and accordingly, the number of hard-shell inclusion strain gauge 10 can also be set according to the needs of stress monitoring. For example, a data acquisition module 20 can be connected to multiple hard-shell inclusion strain gauges 10, and monitored data can be collected from multiple hard-shell inclusion strain gauges 10 and sent to the automatic analysis module 30 for automatic analysis, The automatic analysis module 30 can obtain the stress status of corresponding monitoring points in underground engineering.

In the embodiment of the application, the data acquisition module 20 achieves cascading between the hard-shell inclusion strain gauge 10 and transmits data to the automatic analysis module 30 through a data bus. The automatic analysis module 30 can automatically calculate and analyze the collected data to eliminate interference signals and the impact of temperature changes on the data during the collection and transmission process.

Figure 2:
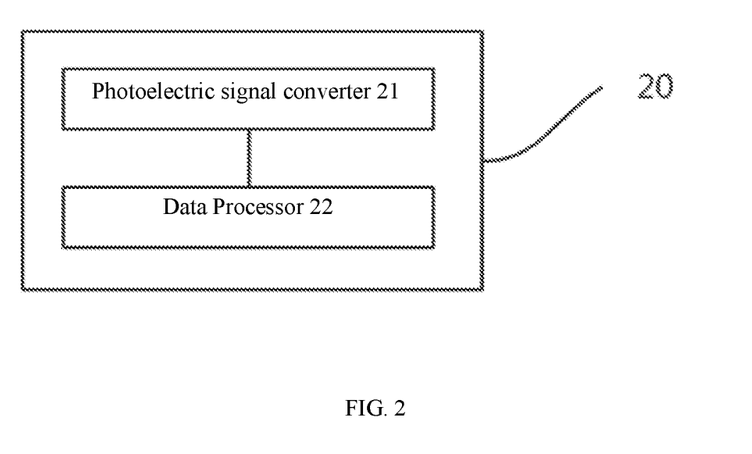
FIG. 2 is a structural schematic diagram of a data acquisition module in a high frequency real-time monitoring system for 3D stress in surrounding rockmass of underground engineering provided in the embodiment of the application.

In the embodiment of the application, the data acquisition module 20 includes a photoelectric signal converter 21 and a fiber grating demodulator 22, wherein the photoelectric signal converter 21 is connected to the hard-shell inclusion strain gauge 10 and the fiber grating demodulator 22, respectively, and the fiber grating demodulator 22 is connected to the automatic analysis module 30.

Specifically, the data acquisition module 20 includes an optoelectronic signal converter 21 and a data processor 22. The optoelectronic signal converter 21 is arranged near the monitored hard-shell inclusion strain gauge 10. One end of the optoelectronic signal converter 21 is connected to the hard-shell inclusion strain gauge 10 through a flame-retardant communication cable, and the other end of the optoelectronic signal converter 21 is connected to data processor 22 through a flame-retardant communication cable to convert the electrical signal of the monitored hard-shell inclusion strain gauge 10 into an optical signal and transmit it to the data processor 22, and convert it into an electrical signal, and then transmit it to the automatic analysis module 30 through the local area network. This application converts the electrical signal of the hard-shell inclusion strain gauge 10 into an optical signal through the photoelectric signal converter 21 for transmission, avoiding interference from electromagnetic fields during the transmission process of the electrical signal of the hard-shell inclusion strain gauge 10 and ensuring the quality of signal transmission. In addition, the use of optical signals for transmission avoids the problem of attenuation of electrical signals and improves transmission efficiency. The conversion between photoelectric signals enables the monitoring frequency of the monitoring system to reach up to 300 Hz, greatly expanding the monitoring range for mining rock burst.

In the embodiment of this application, the automatic analysis module 30 can obtain strain data at the corresponding monitoring point of the hard-shell inclusion strain gauge 10 through the resistance change of the hard-shell inclusion strain gauge 10, and can obtain the orientation information of the hard-shell inclusion strain gauge 10 based on the installation data of the hard-shell inclusion strain gauge 10. The automatic analysis module 30 converts the collected strain data into 3D stress data of surrounding rock on the underground engineering according to the elastic modulus, Poisson's ratio and orientation information of the reservoir of the hard-shell inclusion strain gauge 10, and then obtains the stress state at the monitoring point. The automatic analysis module 30 can automatically analyze the 3D stress at the monitoring location based on the signal of the hard-shell inclusion strain gauge 10, and send the 3D stress to other computers, mobile phones, and other devices through the Internet, and provide early warning of dynamic disasters based on the 3D stress.

Specifically, the automatic analysis module 30 can be a computer, PLC controller, etc. The specific working principle of the automatic analysis module 30 will be described in detail in the following sections.

Figure 3:
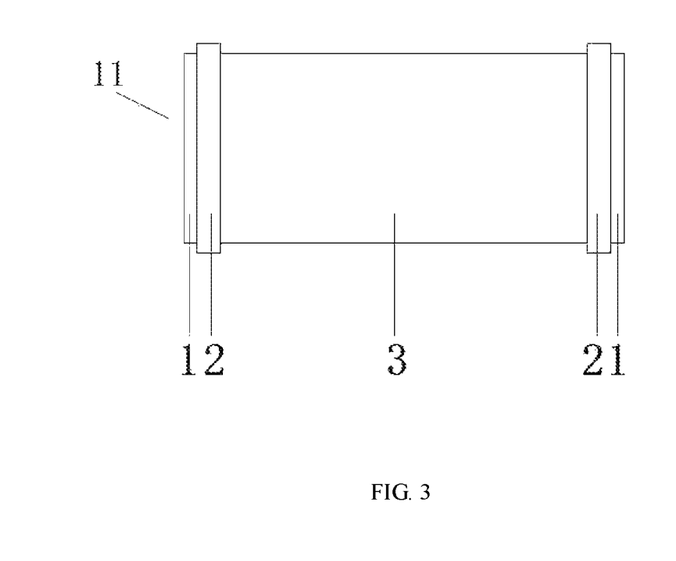
FIG. 3 is a structural schematic diagram of the external part of a hard-shell inclusion strain gauge in a high frequency real-time monitoring system for 3D stress in surrounding rockmass of underground engineering provided in the embodiment of the application.
Figure 4:
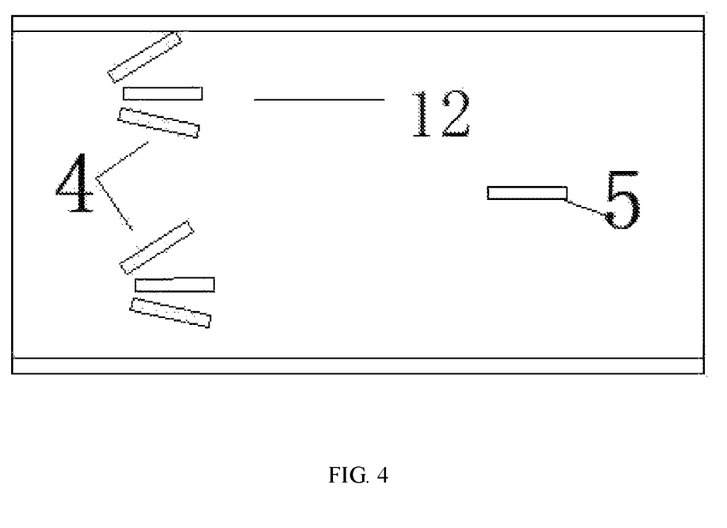
FIG. 4 is a structural schematic diagram of the internal part of a hard-shell inclusion strain gauge in a high frequency real-time monitoring system for 3D stress in surrounding rockmass of underground engineering provided in the embodiment of the application.

In the embodiment of the application, the hard-shell inclusion strain gauge 10 includes an elastic cylinder 11 and at least three sets of strain rosettes 12, wherein the elastic cylinder 11 is installed in the borehole, and at least three sets of strain rosettes 12 are arranged on the inner wall of the elastic cylinder 11 along the circumference with equal spacing.

In the experiment, a hard-shell inclusion strain gauge 10 is produced in this application, which includes an elastic cylinder 11 and at least three sets of strain gauge rosettes 12.

In the embodiment of this application, the elastic cylinder 11 is made of elastic steel, with a thickness not less than 2 mm.

Specifically, the shells of monitoring devices in existing technologies are generally made of industrial plastic, with an elastic modulus of 2-3 GPa. Due to the lack of awareness in previous studies that the material of the shell can affect the accuracy of long-term measurement results, the selection of shell materials has not been given much attention.

Through experiments, this application found that the shell material in the existing technology has strong rheology, which will seriously affect the accuracy of long-term monitoring and cannot be used for long-term monitoring. When the shell of the monitoring device hard-shell inclusion strain gauge 10 is changed to the elastic steel with a thickness not less than 2 mm, the range of the hard-shell inclusion strain gauges 10 is not less than 150 MPa, the modulus of the elastic cylinder 11 reaches 200 GPa, the tensile strength is not less than 700 MPa, and the rheological properties of the elastic cylinder 11 are significantly reduced, ensuring the measurement accuracy during long-term monitoring.

In the embodiment of the application, the elastic cylinder 11 includes an elastic cylinder 3, an elastic gland 1, and an elastic nut 2, wherein the two ends of the elastic cylinder 3 are opened, and the elastic nut 2 correspondingly screws the elastic gland 1 to the two end openings of the elastic cylinder 3, and the elastic gland 1 correspondingly blocks the two end openings of the elastic cylinder 3.

Specifically, the elastic cylinder 3 is cylindrical in shape, with openings at both ends. The elastic gland 1 can at least fully cover the openings at both ends of the elastic cylinder 3, and each end opening is provided with an elastic nut 2. The elastic nut 2 is used to lock the elastic gland 1 at the opening and ensure that the elastic gland 1 fully covers the opening, so that the strain rosette 12 inside the elastic cylinder 11 is completely isolated from the outside, ensuring the accuracy of stress measurement. The elastic cylinder 11 is fixed with strain rosette 12, and the cable of strain rosette 12 is led out through the port of the elastic cylinder 11 and connected to the photoelectric signal converter 21 to convert the electrical signal of the hard-shell inclusion strain gauge 10 into an optical signal and transmit it to the fiber grating demodulator 22.

Figure 6:
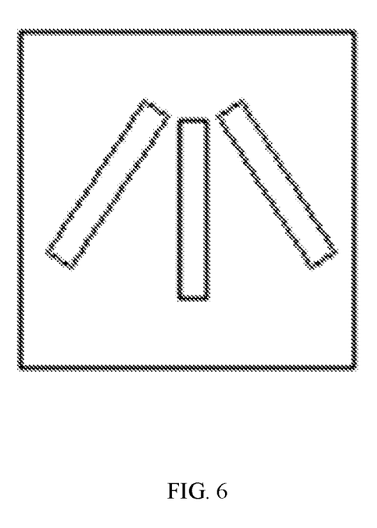
FIG. 6 is the layout diagram of a resistance strain gauge in a hard-shell inclusion strain gauge in a high frequency real-time monitoring system for 3D stress in surrounding rockmass of underground engineering provided by the embodiment of the application.

In the embodiment of the application, the strain rosette 12 includes at least three resistance strain gauges 4, and all the resistance strain gauges 4 are respectively arranged on the inner wall of the elastic cylinder 11 in a direction of circumferential, axial or ±45° with respect to the axis. The resistance strain gauge 4 is used as a measuring element. When the installation position of the measuring element from the outer wall of the shell in the existing technology to the inner wall of the elastic cylinder 11, the resistance strain gauge of the measuring element can be isolated and protected, significantly improving the success rate of installation and usage. Moreover, substituting resistance strain gauge 4 for fiber optic grating improves the stability of product performance and enhances the success rate in manufacturing, installation, and application phases.

In the embodiment of the application, at least 6 of the 9 resistance strain gauges 4 are arranged in directions that are not parallel to each other.

Figure 5:
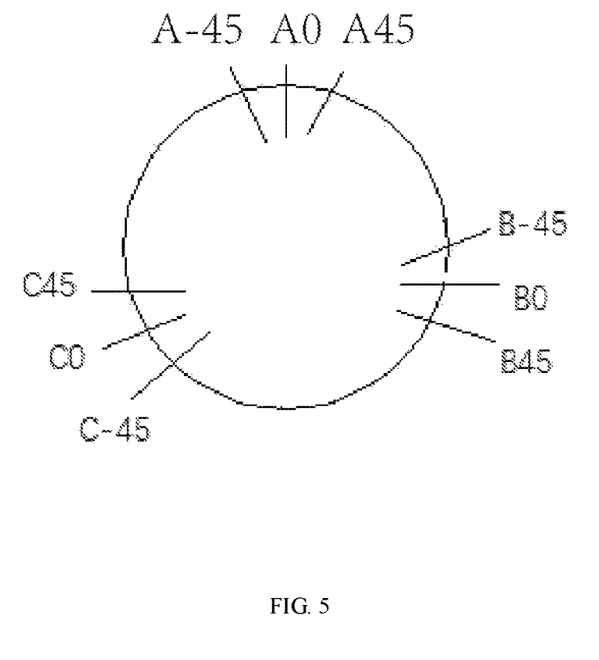
FIG. 5 is a schematic diagram of the arrangement of strain rosettes in a hard-shell inclusion strain gauge in a high frequency real-time monitoring system for 3D stress in surrounding rockmass of underground engineering provided in the embodiment of the application.

Specifically, three sets of strain gauge rosettes 12 are equally spaced on the inner wall of the elastic cylinder 11 along the same circumferential direction. Each set of strain gauges 12 is provided with at least three resistance strain gauges 4, and each resistance strain gauge 4 is respectively arranged along the circumferential direction, axial direction, or the direction with an interval of ±45° from the axial direction. With this arrangement, more than 6 independent equations are obtained, the calculation principle is more simple and clear, and the data processing can ensure that the collection results are more scientific and accurate.

In the embodiment of the application, the range of the resistance strain gauge 4 is not less than 2000 micro strains.

Specifically, the hard-shell inclusion strain gauge 10 can be used to measure 3D stress changes in rocks, making it particularly suitable for long-term dynamic monitoring of 3D stress changes. The standard hard-shell inclusion strain gauge 10 is equipped with nine resistance strain gauges 4, which can be measured in both isotropic and anisotropic rocks. The resistance strain gauge 4 reflects the external micro strain change through the change of resistance, so as to realize the online measurement of underground engineering surrounding rock or structure. It has the characteristics of high measurement accuracy, adaptability to complex environment, wide measurement range, and long service life. In addition, according to the stress distribution formula of borehole surrounding rock, there are six independent components of 3D stress of surrounding rock. Therefore, at least six non parallel resistance strain gauges 4 need to be set in the elastic cylinder 11 to ensure that there are six independent equations in the calculation formula of borehole surrounding rock stress to solve 3D stress components.

In the embodiment of the application, the hard-shell inclusion strain gauge 10 also includes a temperature compensated strain gauge 5 that is arranged in the elastic cylinder 11 along the axial direction, and uses the elastic steel as the base material.

Specifically, the hard-shell inclusion strain gauge 10 is also equipped with a temperature compensated strain gauge 5 that is not stressed and can be freely retracted. The base material of the temperature compensated strain gauge 5 is the same as that of the resistance strain gauge 4, both of which are elastic steel. The parameters of the temperature compensated strain gauge 5 are the same as those of the resistance strain gauges 4. The measurement error caused by temperature disturbance can be eliminated by setting the temperature compensated strain gauge 5 to ensure the accuracy of the measurement results of the hard-shell inclusion strain gauge 10. The temperature compensated strain gauge 5 generate strain independent of additional external forces and only synchronize with the elastic cylinder 11 in terms of temperature. By measuring the effect of temperature changes on the strain readings of the temperature compensated strain gauge 5 and calculating to deduct the effect of temperature changes on all the resistance strain gauges 4, the temperature compensation function can be achieved.

In the embodiment of the application, the gap between the outer wall of the elastic cylinder 11 and the inner wall of the borehole is filled with quick-setting grouting material.

Specifically, the hard-shell inclusion strain gauge 10 is composed of a series of resistance strain gauges 4 packaged on the inner wall of an elastic cylinder 11 with a known elastic modulus. Multiple hard-shell inclusion strain gauges 10 can be assembled together according to testing requirements, and multiple hard-shell inclusion strain gauges 10 can be installed in a borehole, thus achieving one-hole and multiple-point 3D stress measurement to obtain more comprehensive and rich 3D stress data.

The outer diameter of the elastic cylinder 11 is 36 mm, and the diameter range of the drill rod for general testing borehole is 38-75 mm. The hard-shell inclusion strain gauge 10 is installed in a 38-75 mm borehole suitable for its shape, and is bonded to the inner wall of the borehole using a quick-setting grouting material with similar mechanical properties to the surrounding rock of the borehole. The diameter of the elastic cylinder 11 is smaller than the diameter of the drill rod, and the 3D stress of the surrounding rock can be measured over time. The outer diameter of the elastic cylinder 11 is chosen to be 36 mm, which can ensure that the hard-shell inclusion strain gauge 10 can penetrate deep into the borehole, and also ensure that the thickness of the solidified colloid is appropriate. This can provide sufficient bonding strength while avoiding excessive use of the colloid resulting in wastage.

The following is a detailed description of the working principle of the automatic analysis module 30 using a computer as an example.

The computer (i.e., the automatic analysis module 30) stores the corresponding relationship between the resistance change of the resistance strain gauge 4 and the strain data at the monitoring point of the hard-shell inclusion strain gauge 10 (the corresponding relationship can be obtained in advance through tests). The elastic cylinder 11 of the hard-shell inclusion strain gauge 10 is installed in the borehole of the underground engineering, and a resistance strain gauge 4 is arranged on the inner wall of the elastic cylinder 11. When the borehole is deformed, the elastic cylinder 11 and the resistance strain gauge 4 on its inner wall are correspondingly deformed, and the resistance of the resistance strain gauge 4 is changed and detected by the measuring circuit. The electrical signal detected by the measurement circuit (representing a change in resistance) is converted into an optical signal through the photoelectric signal converter 21 and transmitted to the fiber grating demodulator 22. The fiber grating demodulator 22 converts the optical signal into an electrical signal and transmits it to the computer. The computer can calculate the strain data at the corresponding monitoring point of the hard-shell inclusion strain gauge 10 through the resistance change of the resistance strain gauge 4 and the pre-stored corresponding relationship.

The computer also stores the corresponding linear elasticity calculation formula. When the strain data at the monitoring point is obtained, the strain data can be automatically substituted into the elasticity calculation formula to obtain the 3D stress state at the monitoring location. In short, the automatic analysis module 30 can obtain the strain data of the borehole wall at the installation position of the hard-shell inclusion strain gauge 10 according to the resistance change of the resistance strain gauge 4 in the hard-shell inclusion strain gauge 10, and then calculate the 3D stress at the corresponding monitoring point through the relevant theory of linear elasticity.

Specifically, the principle of obtaining the 3D stress of rockmass in underground engineering by measuring the strain at the borehole wall is as follows:

Assuming that the rockmass in underground engineering is an elastic homogeneous body, when the borehole is subjected to 3D stress of the rockmass at infinite distance, the formula for the stress distribution of the surrounding rock of the borehole is:

$$\sigma_r = \frac{\sigma_x + \sigma_y}{2}\left(1 - \frac{a^2}{r^2}\right) + \frac{\sigma_x - \sigma_y}{2}\left(1 - 4\frac{a^2}{r^2} + 3\frac{a^4}{r^4}\right)\cos 2\theta + \tau_{xy}\left(1 - 4\frac{a^2}{r^2} + 3\frac{a^4}{r^4}\right)\sin 2\theta \quad (1)$$

$$\sigma_\theta = \frac{\sigma_x + \sigma_y}{2}\left(1 + \frac{a^2}{r^2}\right) - \frac{\sigma_x - \sigma_y}{2}\left(1 + 3\frac{a^4}{r^4}\right)\cos 2\theta - \tau_{xy}\left(1 + 3\frac{a^4}{r^4}\right)\sin 2\theta \quad (2)$$

$$\sigma_z' = -\nu\left[2(\sigma_x - \sigma_y)\frac{a^2}{r^2}\cos 2\theta + 4\tau_{xy}\frac{a^2}{r^2}\sin 2\theta\right] + \sigma_z \quad (3)$$

$$\tau_{r\theta} = \frac{\sigma_x - \sigma_y}{2}\left(1 + 2\frac{a^2}{r^2} - 3\frac{a^4}{r^4}\right)\sin 2\theta + \tau_{xy}\left(1 + 2\frac{a^2}{r^2} - 3\frac{a^4}{r^4}\right)\cos 2\theta \quad (4)$$

$$\tau_{\theta z} = (-\tau_{zx}\sin\theta + \tau_{yz}\cos\theta)\left(1 + \frac{a^2}{r^2}\right) \quad (5)$$

$$\tau_{zr} = (\tau_{zx}\cos\theta + \tau_{yz}\sin\theta)\left(1 - \frac{a^2}{r^2}\right) \quad (6)$$

Where, $\sigma_x$, $\sigma_y$, $\sigma_z$, $\tau_{xy}$, $\tau_{yz}$ and $\tau_{zx}$ represent the 3D stress in the rockmass in a Cartesian coordinate system; $\sigma_r$, $\sigma_\theta$, $\sigma_z'$, $\tau_{r\theta}$, $\tau_{\theta z}$ and $\tau_{zr}$ represent the stress in the surrounding rock around the hole in the cylindrical coordinate system; a is the drilling radius.

According to the theory of elasticity, the relationship between stress, displacement, and strain in cylindrical coordinates is as follows:

$$\varepsilon_r = \frac{\partial u}{\partial r} = \frac{1}{E}(\sigma_r - \mu\sigma_\theta - \mu\sigma_z') \quad (7)$$

$$\varepsilon_\theta = \frac{u}{r} + \frac{1}{r}\frac{\partial v}{\partial \theta} = \frac{1}{E}(\sigma_\theta - \mu\sigma_r - \mu\sigma_z') \quad (8)$$

$$\varepsilon_z' = \frac{\partial w}{\partial z} = \frac{1}{E}(\sigma_z' - \mu\sigma_\theta - \mu\sigma_r) \quad (9)$$

$$\gamma_{r\theta} = \frac{1}{r}\frac{\partial u}{\partial \theta} + \frac{\partial v}{\partial r} - \frac{v}{r} = \frac{\tau_{r\theta}}{G} \quad (10)$$

$$\gamma_{\theta z} = \frac{\partial v}{\partial z} + \frac{1}{r}\frac{\partial w}{\partial \theta} = \frac{\tau_{\theta z}}{G} \quad (11)$$

$$\gamma_{zr} = \frac{\partial u}{\partial z} + \frac{\partial w}{\partial r} = \frac{\tau_{zr}}{G} \quad (12)$$

Among them, $\varepsilon_r$, $\varepsilon_\theta$ and $\varepsilon_z$, are normal strains, $\gamma_{r\theta}$, $\gamma_{\theta z}$ and $\gamma_{zr}$ are shear strains, u is the radial displacement, v is the circumferential displacement, w is the axial displacement, and E is the elastic modulus, $\mu$ is Poisson's ratio, $$G = \frac{E}{2(1+\mu)}.$$

From equations (7) to (12), it can be found that the strain or displacement at the borehole wall corresponds to the stress of the surrounding rock at the borehole edge. From equations (1) to (6), it can be seen that the 3D stress of the rockmass can be determined by the stress of the surrounding rock around the hole. Therefore, the 3D stress of rockmass in underground engineering can be obtained by measuring the strain or displacement at the hole wall.

Specifically, the specific layout scheme of resistance strain gauge 4 and temperature compensated strain gauge 5 is as follows:

As shown in FIG. 5, the inner surface of the elastic cylinder 11 is embedded with three sets of strain rosettes 12 A, B and C at equal intervals (120°) along the same circumference. Each set of strain rosettes 12 is composed of three resistance strain gauge 4, and each resistance strain gauge 4 is 45° apart from each other. The parameters of the temperature compensated strain gauge 5 are consistent with the resistance strain gauge 4, and are arranged on the inner surface of the elastic cylinder 11 to eliminate the resistance change caused by temperature disturbance, so that the strain measurement is not affected by the environmental temperature change.

In this application, the resistance strain gauge 4 is arranged on the tested object for the deformation test of materials, and the temperature compensated strain gauge 5 is arranged on the same material and non-stressed components, only for sensing the temperature change. The real strain of the material can be obtained by taking the temperature compensated strain gauge 5 as a reference. Using temperature compensation, the problem of strain temperature cross sensitivity is solved, and the strain measurement error caused by temperature disturbance is eliminated. The automatic analysis module 30 is connected with the temperature compensated strain gauge 5, so that the automatic analysis module 30 can directly calculate the accurate 3D stress value after eliminating the temperature influence.

The specific implementation plan for adopting a 3D stress monitoring system for underground engineering provided in this application is as follows:

Step 1: Construct and install boreholes: Use SGM-1A geological drilling rig with a (φ42 mm extension drill rod and a specially designed drill bit (φ38~75 mm) at the selected test location to drill and install boreholes on the wall of the measured tunnel. The upward inclination of the borehole is greater than 5° for drainage and cleaning of the borehole. After the hole is drilled, rinse it with water, and then wash it with alcohol or acetone.

Step 2: Assemble the 3D stress monitoring device: According to the measurement requirements, assemble one or more hard-shell inclusion strain gauges 10.

Step 3: Check the reliability and stability of the monitoring device: Connect the hard shell package strain gauge 10 to the automatic analysis module 30 through the photoelectric signal converter 21 and the fiber grating demodulator 22, and check the reliability and stability of the system.

Step 4: Install a 3D stress monitoring device: Use a push rod to place the assembled monitoring device at the designated position in the borehole, and prepare quick-setting grouting material on site. Then, inject the fast setting grouting material into the borehole, and after solidification, complete the installation of the hard-shell inclusion strain gauge 10 in the borehole.

Step 5: Conduct long-term dynamic monitoring of 3D stress: obtain 3D stress of underground works based on resistance strain gauge sensing technology and 3D stress calculation formula.

Through the design of the structure of the elastic cylinder 11, the selection of the material thickness of the elastic cylinder 11, the limitation of the inner diameter of the cylinder, and the use of the resistance strain gauge 4, the application enables the hard-shell inclusion strain gauge 10 to measure the 3D stress, while improving the monitoring range and service life of the hard-shell inclusion strain gauge 10. It has strong adaptability to complex geological and hydrological conditions in underground engineering and can be used not only for rock stress testing during construction but also for long-term dynamic tracking and monitoring during operation, ensuring good stability and high reliability. This technology is internationally leading and fills the industry gap.

It can be seen that the 3D stress monitoring system for underground engineering provided in this application can realize the dynamic long-term monitoring of the 3D stress evolution process of rock burst under the complex environment of underground engineering, truly reflect the real-time state, spatial distribution and evolution law of 3D stress in rockmass. This provides a possibility for long-term, dynamic, effective 3D stress and its distribution testing under complex conditions in underground engineering and provides in-situ basic data for early warning and control of engineering disasters, solving the problem of dynamic monitoring of 3D stress that was previously impossible.

It should be noted that in this article, relational terms such as "first" and "second" are only used to distinguish one entity or operation from another entity or operation, and do not necessarily require or imply any actual relationship or order between these entities or operations. Furthermore, the terms "comprising", "including" or any other variant thereof are intended to cover non-exclusive inclusion, so that a process, method, article, or apparatus that comprises a list of elements is not limited to those elements but may include other elements not expressly listed or inherent to such process, method, article, or apparatus. Unless otherwise limited, the element referred to by the phrase "comprising a . . . " does not exclude the presence of other same elements in a process, method, article, or apparatus that comprises the element.

The above description is only a specific embodiment of the invention, which enables a person skilled in the art to understand or implement the present invention. The various modifications to these embodiments will be apparent to those skilled in the art, and the general principles defined in this article can be implemented in other embodiments without departing from the spirit or scope of the invention. Therefore, the invention will not be limited to the embodiments shown in this article, but rather to the widest range consistent with the principles and novel features applied for herein.

What is claimed is:

1. A hard-shell inclusion strain gauge for 3D stress in surrounding rockmass of underground engineering, characterized in that it comprises an elastic cylinder and at least three sets of strain rosettes, wherein the elastic cylinder is installed in a borehole of the underground engineering, and at least three sets of strain rosettes are equidistant along the circumference on the inner wall of the elastic cylinder; the elastic cylinder comprises an elastic cylinder body, an elastic gland and an elastic nut, wherein, the two ends of the elastic cylinder body are opened, the elastic nut correspondingly tightens and sets the elastic gland at the openings at both ends of the elastic cylinder body, the elastic gland correspondingly blocks the openings at both ends of the elastic cylinder body, the strain rosette comprises at least three resistance strain gauge, and all the resistance strain gauge are arranged on the inner wall of the cylinder body of the elastic cylinder in a direction of circumferential, axial or ±45° with the axial direction respectively; the hard-shell inclusion strain gauge also includes: temperature compensated strain gauge, the temperature compensated strain gauge is arranged in the elastic cylinder along the axial direction, the base material of the temperature compensated strain gauge is the same as the material of the resistance strain gauge, both are elastic steel, and the parameters of the temperature compensated strain gauge are the same as those of the resistance strain gauge; the material of the elastic cylinder is elastic steel, and the thickness of the elastic steel is not less than 2 mm; the range of the hard-shell inclusion strain gauge is not less than 150 MPa; the modulus of the elastic cylinder is 200 GPa, and the tensile strength is not less than 700 MPa; at least 6 of 9 resistance strain gauges are arranged in non parallel directions.

2. The hard-shell inclusion strain gauge for 3D stress in surrounding rockmass of underground engineering as described in claim 1 is characterized in that the range of the resistance strain gauge is not less than 2000 micro strains.

3. The hard-shell inclusion strain gauge for 3D stress in surrounding rockmass of underground engineering as described in claim 1 is characterized in that the gap between the outer wall of the elastic cylinder and the inner wall of the borehole is filled with a quick-setting grouting material.

* * * * *